US012784549B2

(12) United States Patent
McGrath

(10) Patent No.: US 12,784,549 B2
(45) Date of Patent: Nov. 3, 2026

(54) FLICKER WHEEL NOTE DIVERSION

(71) Applicant: Cardtronics USA, Inc., Atlanta, GA (US)

(72) Inventor: Shannon Louise McGrath, Perth (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/174,072

(22) Filed: Apr. 9, 2025

(65) Prior Publication Data

US 2026/0321106 A1 Oct. 15, 2026

(51) Int. Cl.
*G07F 19/00* (2006.01)

(52) U.S. Cl.
CPC .......... *G07F 19/203* (2013.01); *G07F 19/201* (2013.01)

(58) Field of Classification Search
CPC ............................ G07F 19/203; G07F 19/201
USPC ........................................................ 235/379
See application file for complete search history.

(56) References Cited

U.S. PATENT DOCUMENTS 6,032,948 A * 3/2000 Peebles .................. B65H 31/20 271/224
6,276,603 B1 * 8/2001 Patterson ............... G07D 11/10 235/379
2002/0003163 A1 * 1/2002 Peebles .................. G07D 11/14 235/379
2011/0109034 A1 5/2011 Ugajin
2012/0049444 A1 * 3/2012 Keith ..................... B65H 31/36 271/265.01
2025/0308313 A1 * 10/2025 Colston .................. B65H 29/70

FOREIGN PATENT DOCUMENTS

WO WO-02102696 A1 12/2002
WO WO-2020013757 A1 1/2020

* cited by examiner

*Primary Examiner* — Thomas K Pham
*Assistant Examiner* — David Tardif
(74) *Attorney, Agent, or Firm* — Schwegman Lundberg & Woessner, P.A.

(57) ABSTRACT

A media handling apparatus includes an intermediate transport module and a lower transport module with a transition area between them. A flicker wheel is positioned at the transition area, having multiple flicker arms extending radially from a central hub. The flicker wheel is mounted on a drive shaft that also drives transport belts in the lower transport module. The flicker arms extend sufficiently to brush over catch points in the transition area, diverting leading edges of media items away from these catch points and toward the center of the transport path, preventing jams caused by folded or curled media edges. This configuration improves media handling reliability without requiring significant modifications to existing guide profiles.

20 Claims, 7 Drawing Sheets

FLICKER WHEEL NOTE DIVERSION

BACKGROUND

In automated media handling devices, such as automated teller machines (ATMs) and other currency processing systems, the reliable transport of media items through various modules is critical for operational efficiency. However, media items such as banknotes often encounter challenges during transport between different modules within these devices. Particularly problematic are transition points between transport modules, where unavoidable catch points can exist due to design constraints and tolerance requirements. These catch points frequently cause media items with leading edge folds, curls, or other conditioning issues to jam during transport operations. Such jams result in device downtime, increased maintenance requirements, and reduced customer satisfaction. The need for reliable media transport is especially critical in high-volume transaction environments where operational efficiency directly impacts service quality.

DETAILED DESCRIPTION

Figure 1A:
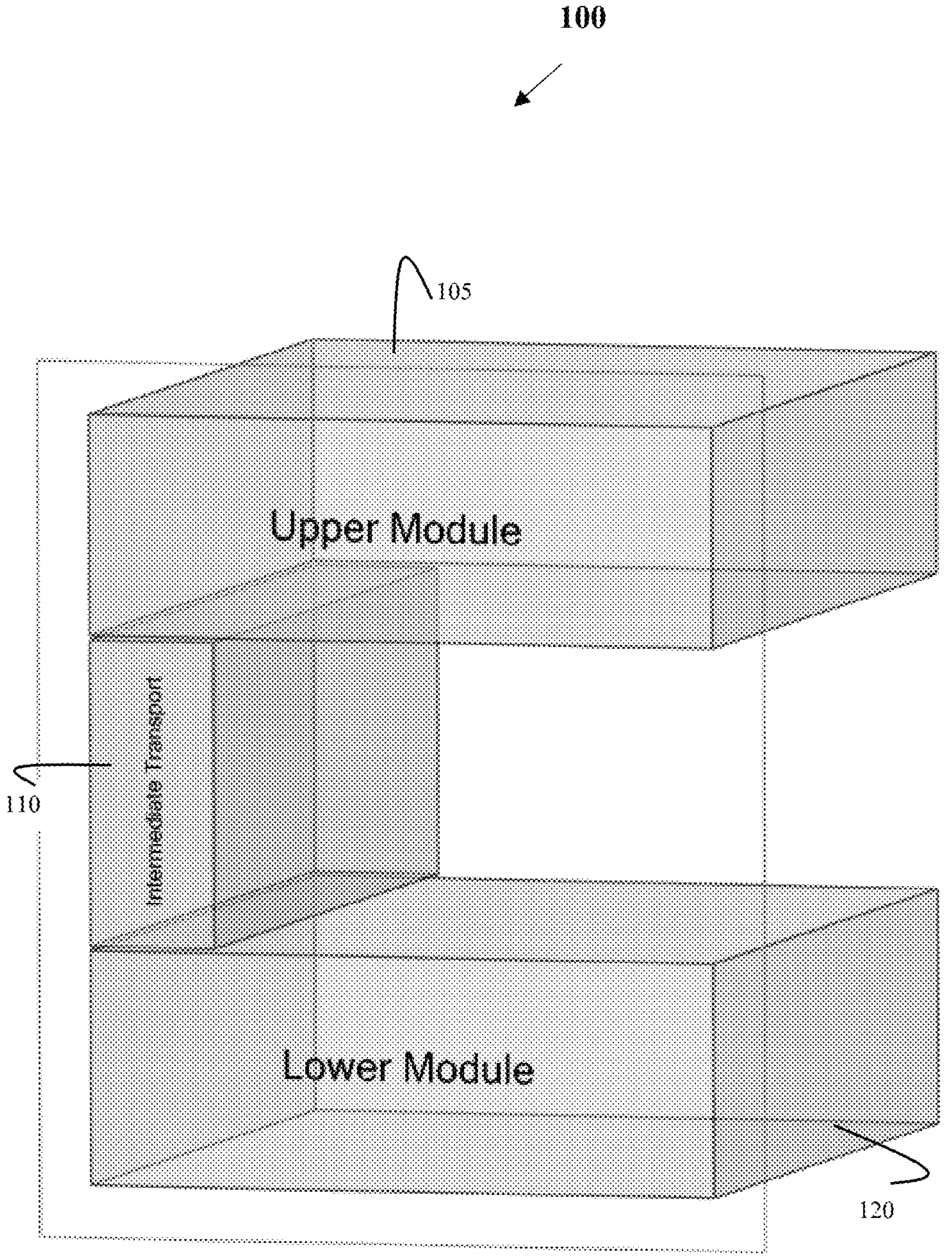
FIG. 1A is a diagram illustrating a high-level and simplified view of a media handling apparatus, according to an example embodiment.

Media handling devices, such as automated teller machines (ATMs) and currency recyclers, rely on complex transport mechanisms to move banknotes and other media items between various processing modules. A particularly challenging aspect of media transport occurs at transition points between different transport modules, such as between an intermediate transport (IMT) and a lower transport front (LTF). At these transition points, unavoidable catch points often exist due to design requirements that accommodate potential misalignment between modules. For example, in some devices, the combing interface teeth between modules have large rounds to make the device tolerant to misalignment, but these rounds result in wider note transport areas where conditioned media can develop problems. Media items with leading edge folds or curls can catch on these transition points, causing the media to jam and fold in on itself rather than proceeding smoothly through the transport path. These jams reduce operational efficiency, increase maintenance requirements, and negatively impact customer experience.

The technical challenge in addressing these transport issues is particularly complex because the catch points cannot be eliminated entirely due to mechanical design constraints. Guide profiles at transition points must accommodate potential misalignment between modules, which necessitates certain geometries that create these catch points. Simply narrowing the transport path is not feasible as it would reduce the system's tolerance for module misalignment. Additionally, any solution must be compatible with existing transport mechanisms and not impede the normal flow of properly conditioned media. The solution must also be cost-effective and easily implementable across various device configurations without requiring substantial redesign of the transport modules themselves.

In an embodiment disclosed herein, a flicker wheel with multiple radially extending arms is positioned at the transition area between transport modules to actively divert media edges away from catch points. The flicker wheel is mounted on the same shaft that provides drive to the lower transport front (LTF) belts, allowing for integration with existing drive mechanisms without requiring additional motors or complex timing systems. The flicker arms extend just far enough to brush over the surface of the guide where catch points exist, effectively guiding the leading edge of media items toward the center of the transport path and away from potential jam points. This approach maintains the necessary tolerance for module misalignment while addressing the specific issue of media jams at transition points.

In an embodiment presented herein, the flicker wheel includes multiple arms extending radially from a central hub, with the length of the arms carefully calibrated to extend just beyond the surface of the guide where catch points exist. The number of flicker wheels can be adjusted based on the specific catch point configuration, with multiple flicker wheels arranged symmetrically across the transport path width when catch points extend along the width of the transport. This symmetrical arrangement helps prevent media skew that might otherwise occur from asymmetrical contact between the flicker arms and the media. The flicker arms can be bidirectional to accommodate media movement in either direction through the transport path, providing flexibility for various operational modes of the media handling device. Simulation testing has demonstrated that this approach significantly reduces jams at the interface between the intermediate transport and lower transport front modules.

In various embodiments, the flicker wheel may be formed from the same material as existing flicker wheels used in other applications within media handling devices, allowing for manufacturing consistency and parts commonality. The flicker arms may have a specific length, such as approximately 12 millimeters, which has been determined through simulation testing to provide optimal performance in diverting media items away from catch points. The simulation testing has demonstrated that this approach significantly reduces jams at the interface between the intermediate transport and lower transport front modules compared to configurations without the flicker wheel implementation.

Having described the concept and challenges addressed by the embodiments presented herein, attention is now directed to specific embodiments illustrated in the accompanying figures. The following descriptions provide detailed explanations of the components and operations of the media handling apparatus with flicker wheel note diversion capabilities.

As used herein, a "transaction terminal," a "media terminal," a "media transaction terminal," and/or "terminal" refers to a standalone composite device operated to perform transactions for or by consumers. A terminal can include an ATM, a self-service terminal (SST), or a point-of-sale (POS) terminal. An SST can include a self-checkout terminal or a kiosk. The terminal includes a variety of peripheral devices, one of which is a media handling device or a media depository. The phrases "media handling device" and/or "media depository" may be used synonymously and interchangeably herein. The media depository handles deposited cash and checks and dispensed cash during a transaction at the terminal.

As used herein, a "media item," "banknote," "note," "bill," and/or "check" may be used synonymously and interchangeably. This is the physical media being processed by a media handling device during a media transaction (e.g., media deposit or media dispense/withdrawal operation) at a transaction terminal.

The media handling apparatus will now be described in detail with reference to the cross-sectional view shown in FIG. 1A, which illustrates the key components involved in the note diversion system.

FIG. 1A is a diagram illustrates a media handling apparatus 100, according to an example embodiment. Notably, the components are shown schematically in simplified form, with only those components relevant to understanding of the embodiments being illustrated.

Furthermore, the various components are illustrated and the arrangement of the components are presented for purposes of illustration only. Notably, other arrangements with more or less components are possible without departing from the teachings of operating a media handling device with flicker wheel media item diversion capabilities, presented herein and below.

FIG. 1A illustrates a simplified view of a media handling apparatus 100, according to an example embodiment. The media handling apparatus 100 includes an upper transport module 105, an intermediate transport module 110, and a lower transport module 120.

Figure 1B:
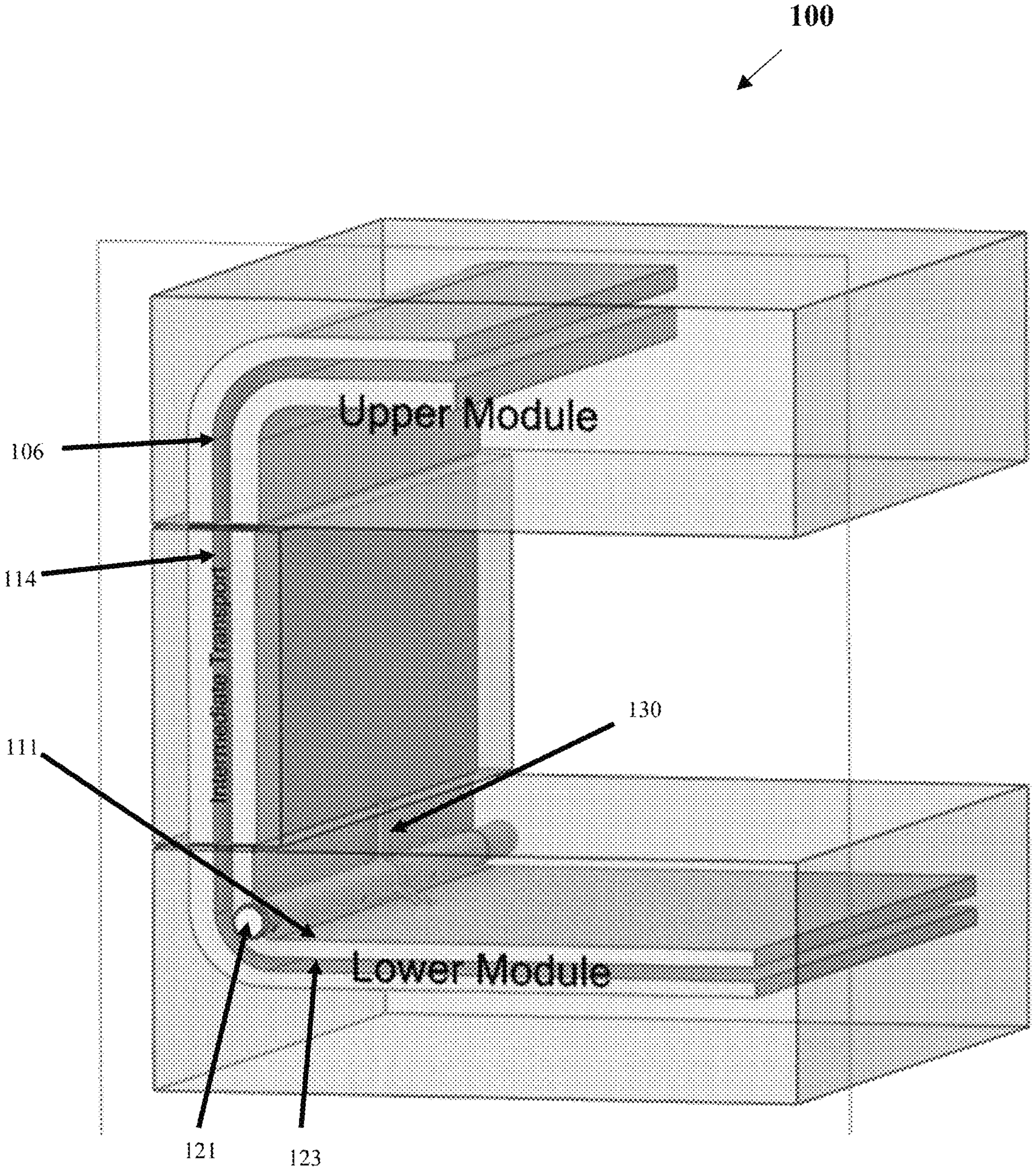
FIG. 1B is a diagram of a cross sectional view of the media handling apparatus, according to an example embodiment.

To better understand the spatial relationships and operational context of the media handling apparatus, FIG. 1B provides a side view that illustrates how other components interact during media transport operations.

FIG. 1B illustrates a cross sectional view of the media handling apparatus 100, according to an example embodiment. The upper transport module 105 includes an upper transport path 106. The intermediate transport module 110 includes an intermediate transport path 114. The intermediate transport module 110 is positioned adjacent to and interfaced to the lower transport module 120. The media handling apparatus further includes a lower transport front 111. The lower transport module 120 includes a drive shaft 121, a flicker wheel 130, and a lower transport path 123.

The drive shaft 121 drives the belts 122 (shown in FIG. E below) to move media items along the lower transport path 123. The flicker wheel 130 is mounted on the drive shaft 121, with flicker wheel arms 131 (shown in FIG. 1C) having a length 132 calibrated to extend just beyond a guide surface 113 (shown in FIG. 1E) or the catch point on the guide surface 113.

In an embodiment, length 132 of the flicker arms 131 are bidirectional to accommodate media movement in either direction through the transport path. The length 132 is calibrated to extend just beyond a guide surface 113. In an embodiment, the flicker arms 131 extend into a space that is wider than adjacent portions of the first transport path or intermediate transport path 114 and the second transport path 123. In an embodiment length 132 extends into width 115 (shown in FIG. 1E) to brush against an upper portion of guide surface 113. In an embodiment length 132 is approximately 12 millimeters.

Having described the overall arrangement of the media handling apparatus 100, attention is now directed to the specific details of the flicker wheel component, which is central to the note diversion functionality.

Figure 1C:
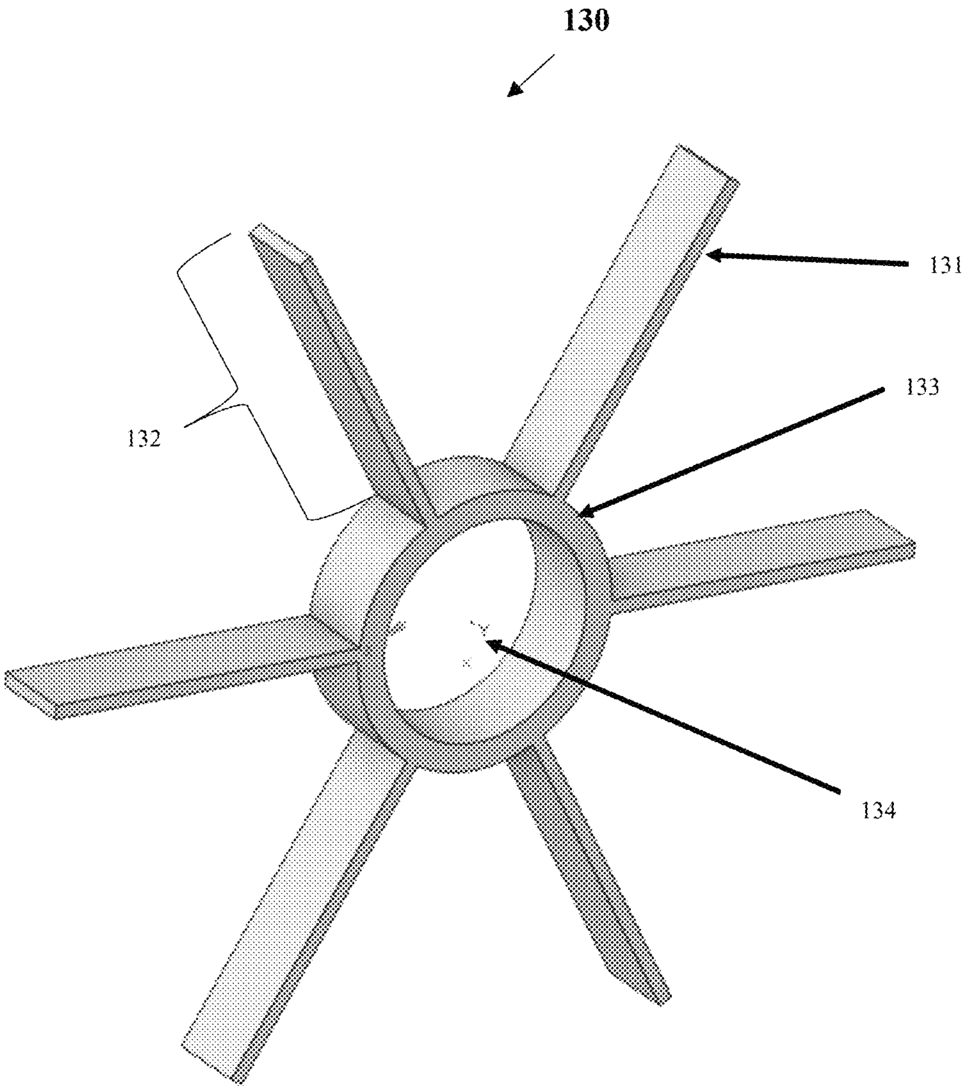
FIG. 1C is a diagram of a flicker wheel for the media handling apparatus, according to an example embodiment.

FIG. 1C illustrates a detailed view of the flicker wheel 130, according to an example embodiment. The flicker wheel 130 includes a central hub 133 with an aperture 134 in the center designed to fit snugly around the drive shaft 121. Multiple flicker wheel arms 131 extend radially from the central hub 133. The length of the flicker wheel arms 131 is calibrated to extend just beyond the surface of the guide where catch points exist, effectively brushing over these points to divert media edges away from potential jam locations. The multiple flicker wheel arms 131 are arranged symmetrically across a width 115 (shown in FIG. 1E) of the transport path. In an embodiment, the flicker wheel is formed from a material having same specifications as released or existing flicker wheels used in other applications within a media handling device (shown in FIG. 2 below).

To understand the advantages provided by the embodiments disclosed herein, it is helpful to examine the limitations of prior art approaches to media handling at transition areas between transport modules.

Figure 1D:
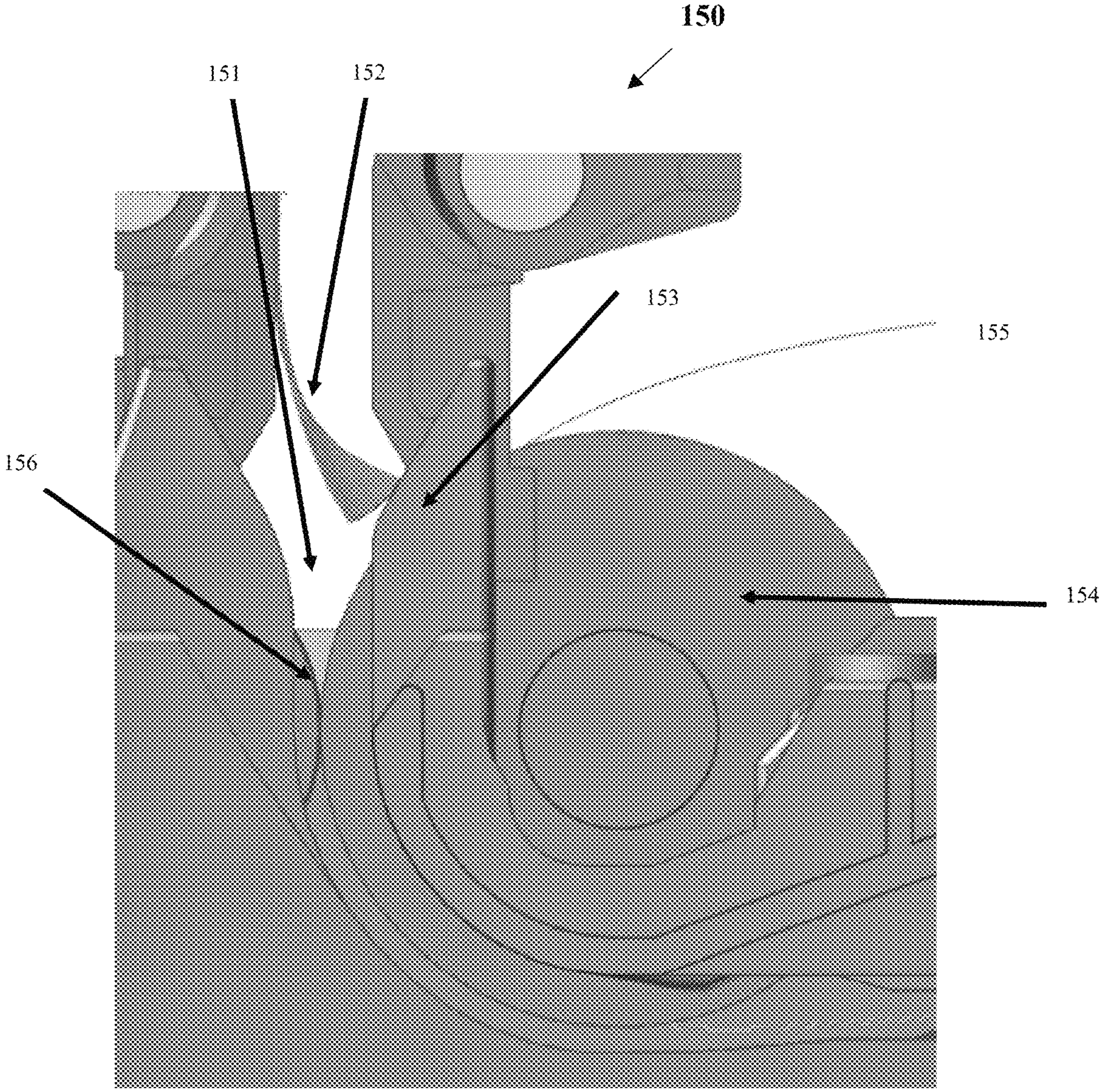
FIG. 1D PRIOR ART
FIG. 1D is a diagram of a prior art media handling apparatus urging a media item from an intermediate transport to a lower transport, according to an example embodiment.

FIG. 1D illustrates a prior art media handling device 150, showing a transition area 151 between an intermediate transport path and a lower transport path. A media item 152 is being transported from the intermediate transport to the lower transport. The prior art device includes a media guide surface 153, which includes or contains a catch point, a drive shaft 154, combing interface teeth 155, and a pinch point 156 to grab the media item and urge it onto the lower transport path. As shown, the media item 152 can catch on the guide surface 153, potentially causing a jam in the transport path by folding the media item 152 against the guide surface 153. The combing interface teeth 155 have large rounds to make the device tolerable to misalignment between the upper and lower transports; however, these rounds result in a wider note transport in this area which can lead to jamming of conditioned media.

Figure 1E:
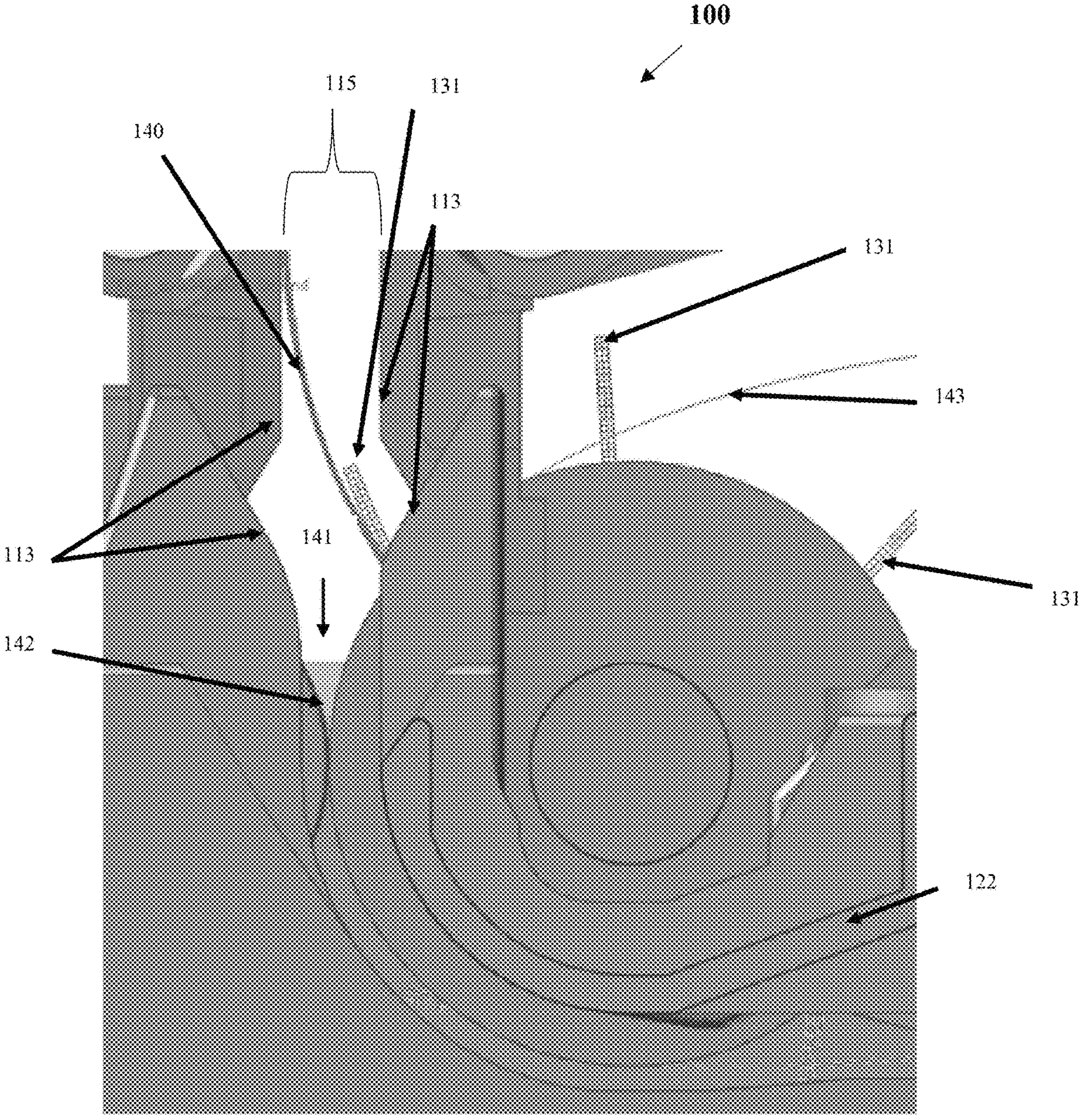
FIG. 1E is a diagram of a system that includes the media handling apparatus urging a media item from an intermediate transport to a lower transport, according to an example embodiment.

In contrast to the prior art approach shown in FIG. 1D, FIG. 1E illustrates how the disclosed flicker wheel implementation effectively addresses the media jamming issue.

FIG. 1E illustrates the media handling apparatus 100 urging a media item 140 from the intermediate transport module to the lower transport module, according to an example embodiment. The transition area 141 between the intermediate transport path and the lower transport path includes combing interface teeth 143 and a pinch point 142 to grab the media item 140 and urge it onto the lower transport path. The flicker wheel arms 131 brush over the catch points or guide surfaces 113 at the transition area 114, diverting the edges of the media item 140 away from these catch points and toward the center of the lower transport path 123. This prevents the media item 140 from jamming at the transition area 141, particularly when the media item has leading edge folds or curls that would otherwise catch on the guide surfaces.

Having described the physical components and operation of the media handling apparatus at the module level, attention is now directed to a system-level implementation that incorporates the media handling apparatus.

Figure 2:
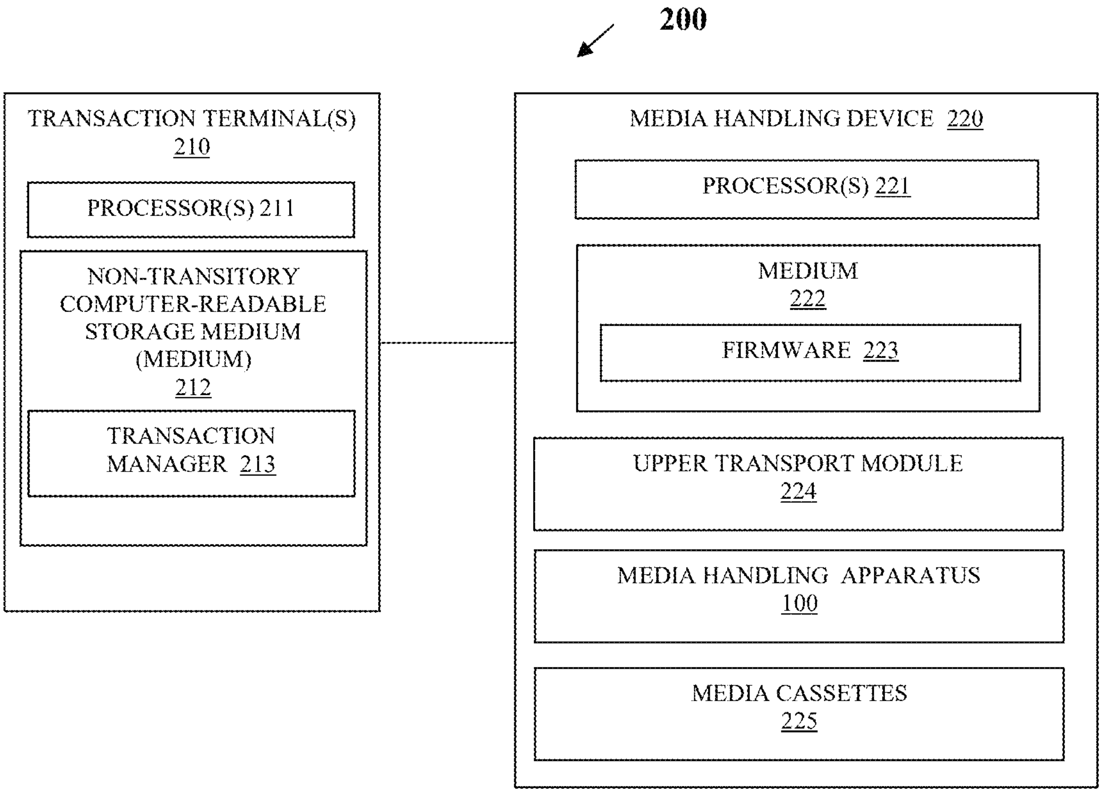
FIG. 2 is a diagram of a system for operating the media handling apparatus, according to an example embodiment.

FIG. 2 is a diagram of a system 200 for operating the media handling apparatus 100, according to an example embodiment. Notably, the components are shown schematically in simplified form, with only those components relevant to understanding of the embodiments being illustrated.

Furthermore, the various components are illustrated and the arrangement of the components are presented for purposes of illustration only. Notably, other arrangements with more or less components are possible without departing from the teachings of operating a transaction terminal or system 200 having media handling apparatus 100, presented herein and below.

The system 200 includes a transaction terminal 210 and a media handing device 220. The transaction terminal 210 includes at least one processor 211 and a non-transitory computer-readable storage medium (medium), which includes instructions for a transaction manager 213. The instructions when executed by the processor 211 cause the processor to perform operations discussed below with respect to 213.

The transaction manager 213 is configured to perform transactions of a customer such as media deposit operations and media dispense operations. In an embodiment, the customer performs a transaction to purchase an item and provides cash as payment for the transaction. In an embodiment, the customer performs a transaction to deposit money via cash items, checks, or a combination of cash items and checks. In an embodiment, the customer performs a transaction to withdraw cash items.

During a deposit operation, media travels from the upper transport module 224 to the intermediate transport module 110 of the media handling apparatus 100, from the intermediate transport module 110 to the lower transport module 120 of the media handling apparatus 100, and into the media cassettes 225. For dispense operations (e.g., media withdrawal transactions, transaction requiring change for a payment, etc.), the media moves from the media cassettes 225 into the lower transport module 120, from the lower transport module 120 into the intermediate transport module 110, from the intermediate transport module 110 into the upper transport module 224, and from the upper transport module 224 to a media dispense located on an outside surface of a housing for terminal 210 where the customer can obtain the dispensed media.

The operational aspects of the media handling apparatus will now be described with reference to FIG. 3, which illustrates a method for utilizing the flicker wheel note diversion capabilities during media transport operations.

Figure 3:
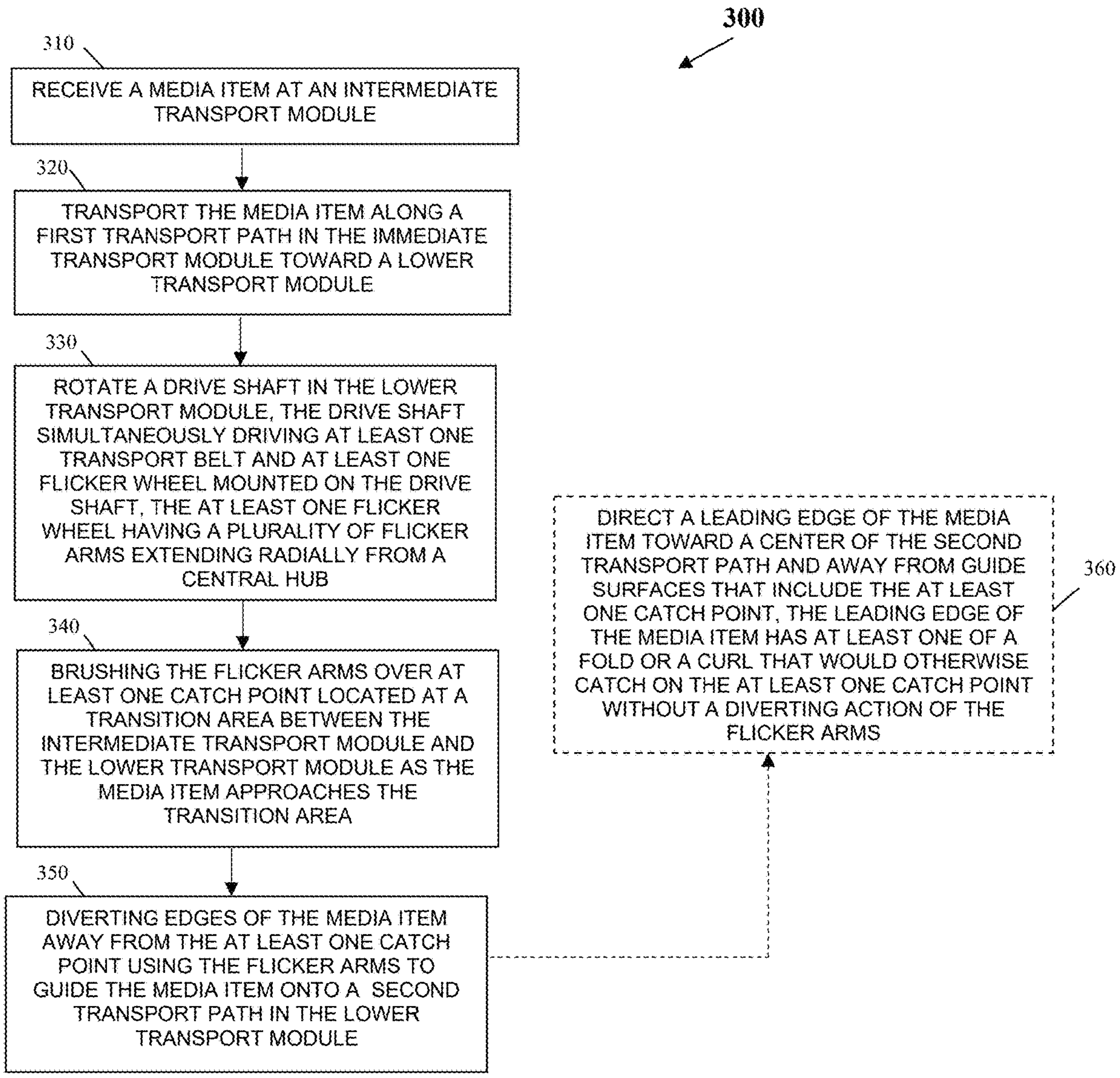
FIG. 3 is a diagram of a flow diagram of a method for operating the media handling apparatus, according to an example embodiment.

FIG. 3 illustrates a flow diagram of a method 300 for operating the media handling apparatus, according to an example embodiment. The software module(s) that implements the method 300 is referred to as “firmware.” The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may have access to one or more network connections during its processing. The network connections can be wired, wireless, or a combination of wired and wireless.

In an embodiment, the device that executes the firmware is media handling device 220. In an embodiment, the firmware controls electromechanical modules or module 224, apparatus 100, and cassettes 225 for deposit transactions and withdraw transactions at terminal 200. The terminal 210 may be an ATM or an SST.

At 310, the firmware detects receipt of a media item at intermediate transport module 110. The media item is received at the intermediate transport module 110. At 320, the firmware causes the media item to be transported or urged along a first transport path 123 in the intermediate transport module 110 toward a lower transport module 120.

At 330, the firmware causes rotation of a drive shaft 121 in the lower transport module 120. The drive shaft 121 simultaneously drives at least one transport belt 122 and at least one flicker wheel 130 mounted on the drive shaft 121. The flicker wheel 130 includes a plurality of flicker arms 131 extending radially from a central hub 133.

At 340, the rotation of the drive shaft 121 causes the flicker arms 131 to brush over at least one catch point located at a transition area 141 between the intermediate transport module 110 and the lower transport module 120 as the media item approaches the transition area 141. At 350, edges of the media item are diverted away from the catch point using the flicker arms 131 to guide the media item onto a second transport path 123 in the lower transport module 120.

In an embodiment, at 350, the diverting at 340 directs a leading edge of the media item towards a center of the second transport path 123 and away from guide surfaces 113. The guide surfaces 113 contain or include the catch point located a the transition area 151 between the intermediate transport module 110 and the lower transport module 120. The leading edge of the media item has at least one of a fold or a curl that would otherwise catch on the catch point without a diverting action caused by the flicker arms 131.

It should be appreciated that where software/firmware is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media handling apparatus comprising:

a lower transport module having a guide surface with at least one catch point located at a transition area between an intermediate transport module and the lower transport module;

wherein the at least one catch point is formed by a rounded interface of combing interface teeth between the intermediate transport module and the lower transport module, the rounded interface configured to accommodate potential misalignment between the intermediate transport module and the lower transport module;

wherein the rounded interface results in a wider note transport area at the transition area;

a drive shaft positioned in the lower transport module;

at least one transport belt coupled to the drive shaft for moving media items along a transport path;

a flicker wheel mounted on the drive shaft, the flicker wheel comprising:

a central hub; and a plurality of flicker arms extending radially from the central hub, wherein the plurality of flicker arms are configured to extend sufficiently to brush over the at least one catch point to divert edges of media items away from the at least one catch point during transport operations.

2. The media handling apparatus of claim 1, further comprising:

an intermediate transport module positioned adjacent to the lower transport module, wherein the at least one catch point is located at a transition area between the intermediate transport module and the lower transport module.

3. The media handling apparatus of claim 2, wherein the intermediate transport module comprises an intermediate transport and the lower transport module comprises a lower transport front.

4. The media handling apparatus of claim 1, wherein the plurality of flicker arms have a length that is calibrated to extend just beyond the guide surface where the at least one catch point exists.

5. The media handling apparatus of claim 1, comprising multiple flicker wheels arranged symmetrically across a width of the transport path.

6. The media handling apparatus of claim 1, wherein the plurality of flicker arms are bidirectional to accommodate media movement in either direction through the transport path.

7. The media handling apparatus of claim 1, wherein the at least one catch point is formed by a rounded interface between transport modules designed to accommodate misalignment between the transport modules.

8. The media handling apparatus of claim 1, wherein the flicker wheel is configured to divert leading edges of media items having folds or curls away from the at least one catch point and toward a center of the transport path.

9. The media handling apparatus of claim 1, wherein the flicker wheel is formed from a material having same specifications as released flicker wheels used in other applications within media handling devices.

10. The media handling apparatus of claim 1, wherein the plurality of flicker arms have a length of approximately 12 millimeters.

11. A system comprising:

an intermediate transport module configured to transport media items along a first transport path;

a lower transport module configured to transport media items along a second transport path, the lower transport module positioned adjacent to the intermediate transport module to form a transition area between the first transport path and the second transport path, wherein the transition area includes at least one catch point formed by a rounded interface of combing interface teeth between the intermediate transport module and the lower transport module, the rounded interface configured to accommodate potential misalignment between the intermediate transport module and the lower transport module, and wherein the rounded interface results in a wider note transport area at the transition area that causes media items having leading edge folds or curls to jam;

a drive shaft positioned in the lower transport module;

at least one transport belt coupled to the drive shaft for moving media items along the second transport path;

at least one flicker wheel mounted on the drive shaft, the at least one flicker wheel comprising:

a plurality of flicker arms extending radially from a central hub, wherein the plurality of flicker arms are configured to brush over the at least one catch point to divert edges of media items away from the at least one catch point as the media items move from the first transport path to the second transport path.

12. The system of claim 11, wherein the intermediate transport module comprises an intermediate transport and the lower transport module comprises a lower transport front.

13. The system of claim 11, wherein the at least one catch point is formed by a rounded interface between the intermediate transport module and the lower transport module designed to accommodate potential misalignment between the intermediate transport module and the lower transport module.

14. The system of claim 11, wherein the at least one flicker wheel is positioned such that the plurality of flicker arms extend into a space that is wider than adjacent portions of the first transport path and the second transport path.

15. The system of claim 11, wherein the media items comprise currency notes, and wherein the plurality of flicker arms are configured to divert leading edges of folded or curled currency notes away from the at least one catch point.

16. The system of claim 11, wherein the at least one flicker wheel comprises multiple flicker wheels arranged across a width of the second transport path to provide symmetrical diversion of media edges.

17. The system of claim 11, further comprising a front transport module positioned upstream of the intermediate transport module in a media transport direction.

18. The system of claim 11, wherein the drive shaft simultaneously provides drive to the at least one transport belt and rotational movement to the at least one flicker wheel.

19. A method comprising:

receiving a media item at an intermediate transport module;

transporting the media item along a first transport path in the intermediate transport module toward a lower transport module;

advancing the media item through a transition area between the intermediate transport module and the lower transport module, the transition area including at least one catch point formed by a rounded interface of combing interface teeth between the intermediate transport module and the lower transport module, the rounded interface accommodating potential misalignment between the intermediate transport module and the lower transport module and resulting in a wider note transport area at the transition area that causes media items having leading edge folds or curls to jam without diversion;

rotating a drive shaft in the lower transport module, the drive shaft simultaneously driving at least one transport belt and at least one flicker wheel mounted on the drive shaft, the at least one flicker wheel having a plurality of flicker arms extending radially from a central hub;

brushing the plurality of flicker arms over at least one catch point located at a transition area between the intermediate transport module and the lower transport module as the media item approaches the transition area; and diverting edges of the media item away from the at least one catch point using the plurality of flicker arms to guide the media item onto a second transport path in the lower transport module.

20. The method of claim 19, wherein diverting edges of the media item comprises directing a leading edge of the media item toward a center of the second transport path and away from guide surfaces containing the at least one catch point, wherein the leading edge of the media item has at least one of a fold or a curl that would otherwise catch on the at least one catch point without a diverting action of the plurality of flicker arms.

* * * * *